United States Patent [19]
Breed

[11] Patent Number: 4,995,639
[45] Date of Patent: Feb. 26, 1991

[54] VEHICLE CRUSH ZONE CRASH SENSOR

[75] Inventor: David S. Breed, Boonton Township, Morris County, N.J.

[73] Assignee: Automotive Technologies International, Inc., Boonton Township, Morris County, N.J.

[21] Appl. No.: 241,538

[22] Filed: Sep. 2, 1988

[51] Int. Cl.$^5$ .............................................. B60R 21/32
[52] U.S. Cl. .................................... 280/735; 180/274
[58] Field of Search ................. 280/734, 735; 180/274

[56] References Cited
U.S. PATENT DOCUMENTS

| | | | |
|---|---|---|---|
| 3,495,675 | 2/1970 | Hass | 180/274 |
| 3,654,412 | 4/1972 | Haruna et al. | 180/274 |
| 3,701,903 | 10/1972 | Merhar | 280/735 |
| 3,774,938 | 11/1973 | Orlando | 180/274 |
| 3,794,794 | 2/1974 | Provancher | 200/61.53 |
| 3,853,199 | 12/1974 | Hirashima et al. | 180/274 |
| 3,859,482 | 1/1975 | Matsui et al. | 200/61.08 |
| 3,861,488 | 1/1975 | Hamada et al. | 180/274 |
| 3,905,015 | 9/1975 | Inose et al. | 180/274 |

FOREIGN PATENT DOCUMENTS 2210420  11/1972  Fed. Rep. of Germany ...... 180/274

Primary Examiner—Kenneth R. Rice
Attorney, Agent, or Firm—Milde & Robinson

[57] ABSTRACT

A crash sensor, designed for arrangement in the crush zone of a motor vehicle, is operative to determine when and if a crash is severe enough to deploy the passive restraint system (e.g. airbag or seat belt tensioner) of the vehicle. The sensor is responsive to trigger the passive restraint system when the vehicle impact with a barrier causes vehicle elements in the crush zone to deform as far back as the sensor position.

21 Claims, 10 Drawing Sheets

VEHICLE CRUSH ZONE CRASH SENSOR

BACKGROUND OF THE INVENTION

Many types of crash sensors have been proposed and used for determining if a crash is severe enough to require the deployment of a passive restraint system such as an air bag or seatbelt tensioner.

Three types of sensors, in particular have been widely used to sense and initiate deployment of an air bag passive restraint system. These sensors include an air damped ball-in-tube sensor such as disclosed in Breed U.S. Pat. Nos. 3,974,350, 4,198,864, 4,284,863, 4,329,549 and 4,573,706, a spring mass sensor such as disclosed in Bell U.S. Pat. Nos. 4,116,132, 4,167,276 and an electronic sensor such as is part of the Mercedes air bag system. Each of these sensors has particular advantages and shortcomings which will be disclosed below.

The choice of the sensor technology to be used on a given vehicle depends on where the sensor is mounted. When a car is crashing only certain portions of the vehicle are crushing at the time that the sensors must trigger to initiate timely restraint deployment. A car, therefore, can be divided into two zones: the crush zone which has changed its velocity substantially relative to the remainder of the vehicle and the non-crush zone which is still travelling at close to the pre-crash velocity. To sense a crash properly in the crush zone the sensors must function as a velocity change indicator; that is, the sensor must trigger at approximately a constant velocity change regardless of the shape or duration of the crash pulse. The response characteristic for a sensor in the non-crush zone must be determined experimentally and generally has a form that for a high deceleration a small velocity change will trigger the sensor and for lower decelerations a larger velocity change is required.

Air damped ball-in-tube crash sensors are inherently velocity change indicators and are the only sensors which have found widespread use for mounting in the crush zone. Spring mass sensors inherently trigger at smaller velocity changes for high deceleration levels and high velocity changes for low deceleration levels and therefore have only found widespread applicability in the non-crush zone locations of the car. Electronic sensors could be designed to function in either manner and thus theoretically could be placed either in the crush zone or in the non-crush zone.

Each of these sensors has significant limitations. If spring mass sensors are placed in the crush zone either they will trigger on very short duration low velocity change crush pulses where a restraint system is not needed or they will not trigger on longer duration pulses where a restraint is needed, depending on the particular sensor design. In addition, since the motion of the mass in the spring mass system is undamped, it has been very difficult to get reliable contact closure on vigorous crash pulses where the mass bounces back and forth many times. To solve this contact problem, spring mass sensors are frequently placed slightly out of the crush zone for frontal barrier impacts. In this case, however, they sometimes become in the crush zone for angle car to car impacts for example, and are prone to both triggering when a restraint is not desired and the contact problems discussed above.

Electronic crash sensors have so far only been used in protected passenger compartment non-crush zone locations. Most electronic sensors have environmental limitations which are exceeded by crush zone locations which are frequently near the engine or radiator. Newer electronic technologies, however, have overcome these environmental limitations and consideration can now be given to crush zone mounted electronic sensors.

Ball-in-tube sensors can be designed to operate either in the crush zone or in the passenger compartment. However, their primary advantages lay in the crush zone. When used in the non-crush zone they trigger slightly faster than a spring mass sensor and slightly slower than an electronic sensor. Ball-in-tube sensors suffer from several significant technical problems. The sensor triggers properly only when responding to longitudinal decelerations. When cross axis accelerations, such as in the vertical and lateral directions are present the ball can begin whirling or orbiting around inside the cylinder resulting in a significant change in the response of the sensor. In one case, for example, a crash sensor would trigger on a 10 mile per hour velocity change in the absence of cross axis vibrations but require as much as a 13 MPH velocity change when the cross axis vibrations are comparable in magnitude to those frequently experienced in the crush zone of a vehicle. One automobile manufacturer had the requirement that an air bag not deploy at 9 MPH or below but must deploy at a 12 MPH or above for impacts into a barrier. The ball-in-tube sensor, due to cross axis effects, was not capable of meeting this requirement and thus the requirement was modified to an 8 MPH no trigger and a 14 MPH all trigger requirement. Thus the ability of the restraint system to protect occupants in marginal crashes has been severely compromised.

The ball-in-tube sensor depends upon the viscous flow of air between the ball and the tube to determine the characteristics of the sensor. The viscosity of air is a function of temperature and although materials are selected for the ball and the tube to compensate for the viscosity change, this compensation is not complete and thus the characteristics of the ball-in-tube sensor will inherently vary with temperature. To achieve the best temperature compensation requires control of the composition of the alloys used for the ball and tube which are considerably beyond normal commercial practice.

In addition, the biasing force which is used to hold the ball at its home position when a vehicle is not in a crash is provided by a ceramic magnet for the ball-in-tube crush zone sensor. This biasing force has a significant effect on the threshold triggering level for long duration pulses such as impacts into snow banks or crash attenuators which frequently surround dangerous objects along the highways. Due to the temperature effects on the magnet, this biasing force changes by about 40% over the desired temperature operating range of the occupant restraint system.

To function properly, a crush zone sensor of any design must be in the crush zone. Any crush zone sensor which is based on a mass sensing deceleration has a potential of triggering very late if it is not in the crush zone for a particular crash. This is particularly a problem with ball-in-tube sensors which have a very low bias. One example of this involved a stiff vehicle in a low speed barrier impact where the sensor was not sufficiently forward in the car and thus not in the crush zone. The sensor triggered when the entire velocity change of the car reached 10 MPH at which time the occupant was leaning against the air bag. An occupant who is severely out of position and close to the air bag when it deploys can be seriously injured by the deploying air bag.

A further shortcoming of all mechanical sensors is that in very vigorous crashes the sensing mass can bounce at the end of its travel, resulting in very short contact closure which may be insufficient to provide enough energy to initiate restraint deployment.

SUMMARY OF THE INVENTION

The present invention seeks to eliminate the drawbacks of the known vehicle crush zone sensors by providing a simple and robust sensor as explained below.

One fact which has not been appreciated by those involved in restraint system design is that for many vehicles the crushing of the vehicle itself is an excellent indicator of the severity or velocity change of the crash. In particular, a typically idealized vehicle will crush 30 inches for a 30 MPH frontal barrier crash. Similarly, the same vehicle will crush approximately 12 inches for a 12 MPH crash and 8 inches for an 8 MPH crash. Naturally, real vehicles will crush different amounts than the idealized vehicle. However, for each vehicle the crush zone propagates further into the vehicle for a 12 MPH frontal barrier impact then for an 8 MPH frontal barrier impact. Thus a very good indicator of the velocity change of the crash is achieved by measuring the distance that the crush zone has propagated into the vehicle.

This invention, therefore, is primarily concerned with using the distance that the crush zone has penetrated the vehicle as the determining factor as to whether an occupant restraint system should be deployed. There are many methods of making this determination and a few will be described herein. A distinguishing feature of all of these methods is the absence of an inertial or deceleration sensing element in the sensor.

The simplest crash sensor employing the teachings of this invention is a simple electric switch. The mounting location of such a switch in the vehicle is critically important as will be discussed in some detail later. A properly designed switch is not affected by temperature or cross axis vibration and will only close when a sufficient force is present to overcome the switch bias. During the crash the metal in front of this switch deforms and moves rearward striking this switch and closing the contacts. In addition, a properly designed switch can provide a minimum contact closure through the use of any one of a number of electronic, meechanical or magnetic hysteresis type principles. Thus, once the sensor has closed it will stay closed for some designated period such as 50 milliseconds.

An electronic pressure sensor can also be used to determine the location of the crush zone. This becomes a very simple device since there would be no need to operate on the output of the transducer other than to check that a certain level of pressure has been exceeded. Also, a wide variation in transducer output with temperature can be tolerated.

A principal object of this invention is to provide a crash sensor which is minimally affected by cross-axis inputs.

Another object of this invention is to provide a crash sensor which is independent of temperature.

A further object of this invention is to provide a crash sensor which will not trigger unless the sensor is in the crush zone.

An additional object of this invention is to provide a small inexpensive yet highly reliable crash sensor.

Still another object of this invention is to provide a sensor for use in the crush zone with built-in hysteresis.

Further objects and advantages of this invention will become obvious from the discussion below.

DETAILED DESCRIPTION OF THE PREFERRED EMBODIMENTS

Figure 1:
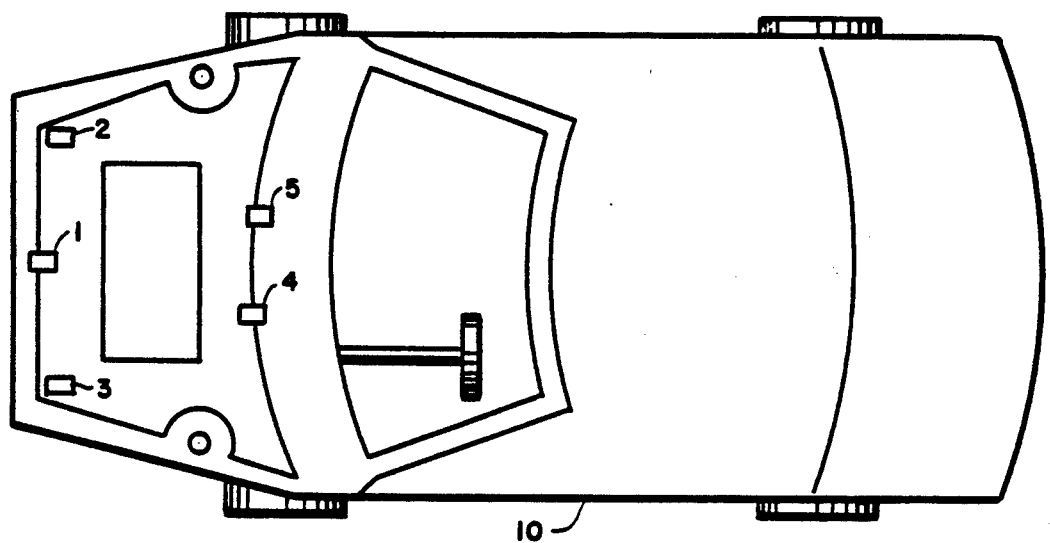
FIG. 1 is a schematic view of a vehicle showing three sensors of the present invention and their location in the crush zone plus an arming sensor and a non-crush zone discriminating sensor in the passenger compartment.

In FIG. 1 crash sensors 1, 2 and 3 are located in the crush zone of the car. In addition, a passenger compartment discriminating sensor 4 is located on the tunnel of the vehicle and an arming or safing sensor 5 which is connected in series with the discriminating sensors is located on the vehicle cowl. FIG. 1 shows a very small stiff vehicle which crushes relatively little during a frontal barrier crash. For this vehicle the crash sensors must be located approximate 5 inches from the front of the vehicle in order to sense the crash in time to deploy the restraint and prevent injury to the occupant. In particular, sensors 1, 2 and 3 are located 5, 7 and 7 inches respectively from the front of the vehicle. During a 30 MPH frontal barrier impact, this vehicle crushes approximately 7 inches at the time the sensor is required to trigger. Thus sensor 1 would initiate restraint deployment in time and sensors 2 and 3 would be marginal. During an angle crash sensors 2 or 3 would trigger in most cases earlier than sensor 1. However, for this vehicle sensor 1 would trigger the restraint in time since for the softer angle barrier impacts, more crush is permitted before the sensor is required to trigger. For this vehicle, for example, 17 inches of crush is available and sensor 1 is within 17 inches of the point of first contact with the barrier for a 30 MPH 30 degree angle barrier impact.

Figure 2:
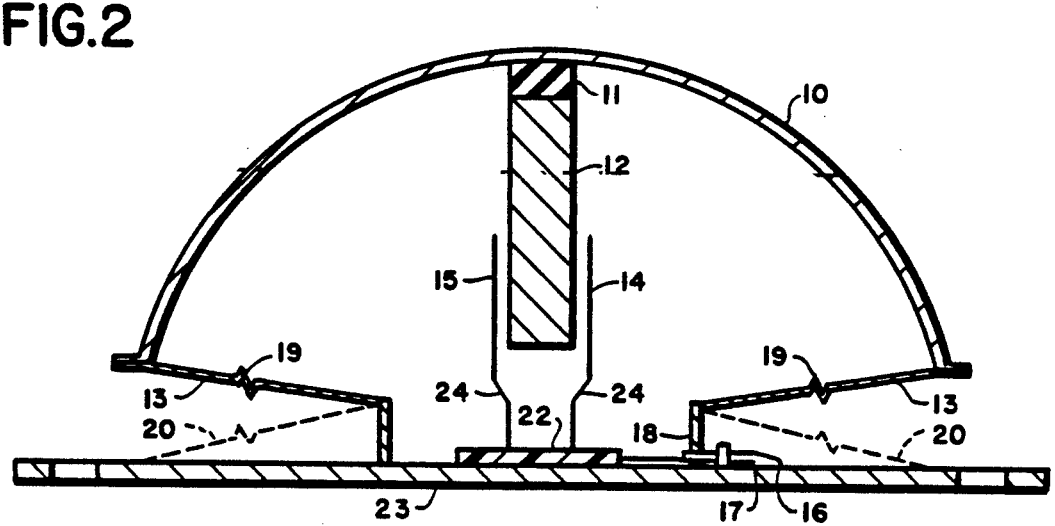
FIG. 2 is a cross section view of a preferred embodiment of the crash sensor of the present invention which employs an omnidirectional switch mechanism with a rigid dome.

FIG. 2 is a cross sectional view of one of many possible configurations of the sensor as taught by this invention. The sensor is a simple switch mechanism which has been designed to permit switch closure from contact forces from a variety of different directions. In this configuration a rigid upper dome member 10 contains a plunger 12 and is connected to a lower snap member 13. Plunger 12 is electrically insulated from dome 10 by insulating material 11. Contacts 14 and 15 are electrically insulated from snap through number 13 and are connected to wires 16 and 17 which lead to the occupant protective system. If contacts 14 and 15 are bridged, the occupant protective system is initiated. If dome 10 is contacted by crushed vehicle sheet metal or other object with sufficient force it will cause snap through number 13 or invert from a concave to a convex shape. When this occurs, plunger 12 touches contacts 14 and 15 completing the electrical circuit and initiating the occupant protection system. If the force is suddenly removed from dome 10, snap through member 13 will invert to its original concave shape and the plunger 12 will no longer connect contact 14 with contact 15 and the circuit will be opened. The natural frequency of the system is designed such that once snap through number 13 has moved to the convex position, illustrated by the dashed line 20, at least 50 milliseconds will lapse, before the snap through number 13 returns to its initial position.

Dome 10 in typically constructed from stainless steel and is at least 0.020 inches thick and about 1.5 inches in diameter. Snap through member 13 is also stainless steel and approximately 0.01 inches thick. Formed in snap through member 13 is a wavy section 19 which is designed to permit adjustment of the force required to invert snap through member 13. The plunger 12 is approximately ⅛ inch thick and can be made from gold plated copper. Contacts 14 and 15 are formed from 0.010 inch thick beryllium copper and are also gold plated. The sensor is hermetically sealed and the electrical connections are made through a conventional glass to metal header 18. Contacts 14 and 15 are held in place by printed circuit board 22 which insulates the contacts from the metal base 23. Printed circuit board 22 is attached to base 23 by any suitable method such as cement or screws. Contacts 14 and 15 are also soldered to header 18 on the inside of the sensor. Wires 16 and 17 are similiarily attached to header 18 on the outside of the sensor. Additional apparatus is required to connect the wires 14 and 15 to the restraint system and to shield and protect them.

Figure 12:
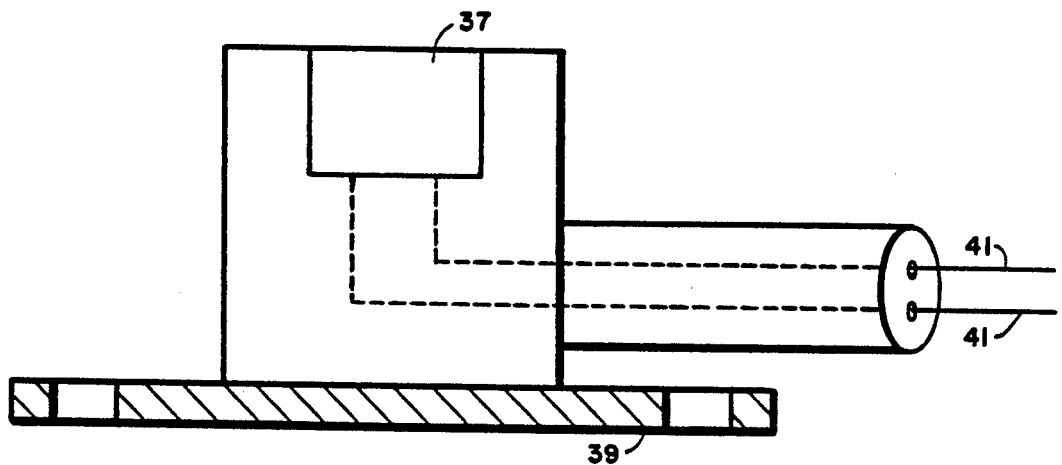
FIG. 12 is a schematic view of an electronic pressure sensor for use as a crush sensor for the crush zone.

An impact at an angle up to 60 degrees will cause dome 10 first to rotate slightly until plunger 12 touches contacts 14 and 15, thereafter the dome will move downward in FIG. 12 which is toward the rear of the vehicle. At impacts at nearly 0 degrees, a straight rearward displacement will occur which will result in plunger 12 touching contacts 14 and 15 at bends 24.

Figure 3:
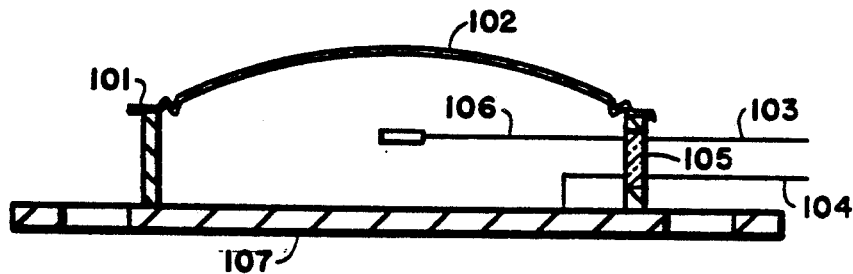
FIG. 3 is a cross section view of another preferred embodiment of the crash sensor of this invention employing an omnidirectional switch mechanism with a flexible dome.
Figure 4:
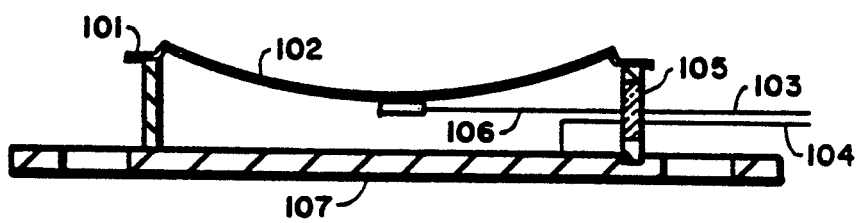
FIG. 4 is a cross section view of the sensor of FIG. 3 shown in the operating position.

An alternate embodiment of a switch type crush sensor is shown in FIG. 3. When crushed material strikes dome 102 with sufficient force, dome 102 inverts and touches contact 106 completing an electrical circuit between wires 103 and 104 as shown in FIG. 4. In this case wire 104 is electrically connected to housing 107 which in turn is connected to dome 102 by means of a weld at interface 101. In this configuration the sensor is hermetically sealed and the electrical connections from outside to inside the sensor are made through a conventional glass to metal seal 105 which has been welded into the wall of housing 107.

Figure 5:
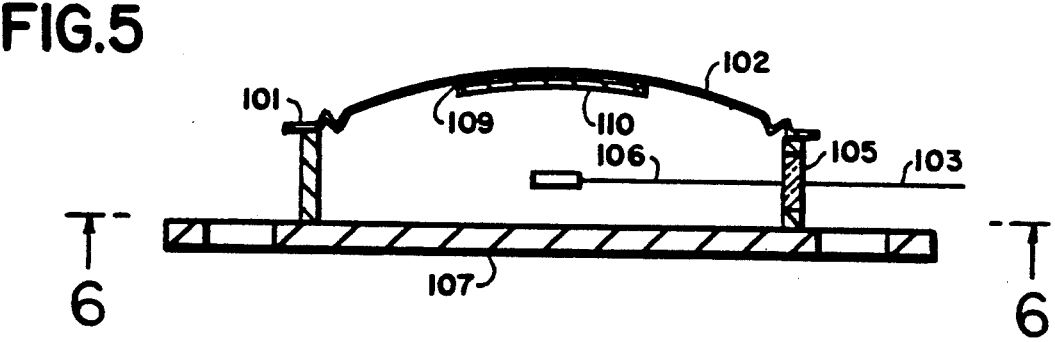
FIG. 5 is an alternate configuration of the sensor of FIG. 3 where two contacts are bridged.
Figure 6:
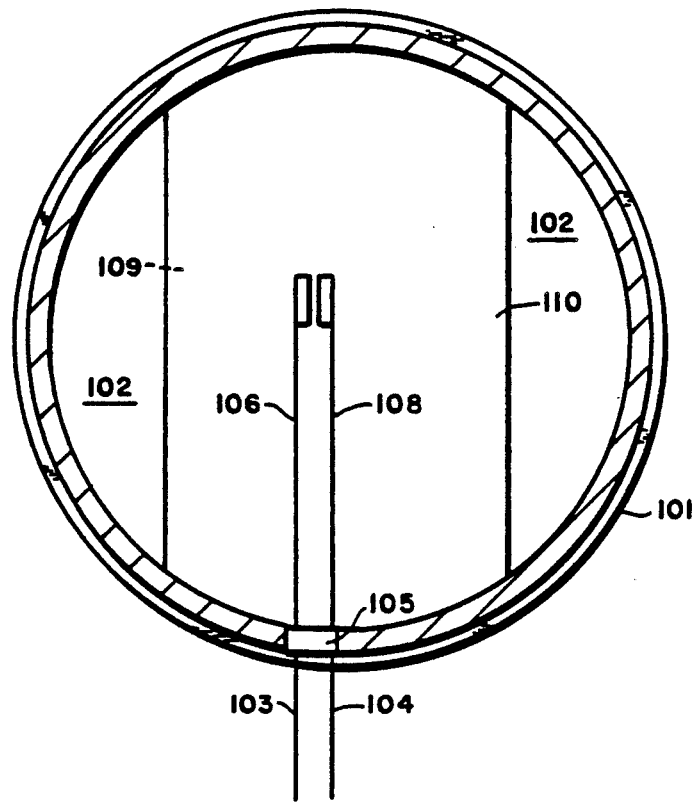
FIG. 6 is a view of the sensor of FIG. 3 taken along line 6—6.

Alternately, dome 102 could be electrically insulated from the body 105 in which case wire 104 would be connected to dome 102 directly. As a further alternative wire 104 could be connected to a second contact 108 and dome 102 would bridge contacts 106 and 108 as shown in FIG. 5. In this case an insulating material 110 could be used to insulate conductor 109 from dome 102 in order to eliminate any electrical connection to the vehicle body. Conductor 109 would then form an electrical connection between contacts 106 and 108 in a crash.

Figure 7:
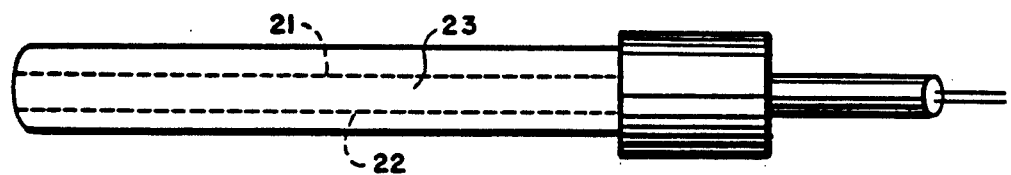
FIG. 7 is a cross section view of a tape switch sensor which may be employed as a crash sensor according to the present invention.

There are many switch type mechanisms which could be used to satisfy the intent of this invention. Different mechanisms might be desired for different vehicles and restraint systems. For those cases where contact duration is not as critical as coverage, a tape switch type switch offers the advantage of covering a broad area of the front of the vehicle. Tape switches of a similar type have been mounted onto steering wheels for use as horn switches. The tape switch of this invention would, of course, require substantially greater force to close than the horn tape switch. Such a switch is depicted schematically in FIG. 7 and consists of two conductors 21 and 22 which are separated by elastic member 23. Such a switch could be mounted across a substantial portion of the front of the vehicle such as along the upper radiator. Any substantial force contacting this switch would cause conductor 21 to touch conductor 22 and thus, initiate the restraint system.

FIGS. 8, 9, 10 and 11 are graphs of the velocity change of the crush zone, the velocity change of the non-crush zone and the crush of the car plotted against time for frontal barrier crashes at 31 MPH, 14 MPH, and 8 MPH and for a 31 MPH 30 degree angle barrier crash. Also, superimposed on these plots is a vertical line indicating the sensor requirement, that is, the latest time that a sensor can trigger the system and provide the proper degree of protection for the occupant.

These plots are derived from integrating acceleration data taken form crashes involving a common mid-size American automobile. The velocity change plots are the first integral of the negative of the deceleration crash pulse measured at the B-Pillar and the Center Radiator Support respectively The crush curve is determined by integrating the B-Pillar deceleration pulse twice taking into account the initial velocity of the vehicle. The B-Pillar is the roof support pillar which is located adjacent to the front seat and is frequently used as the location which most represents the motion of the car where the driver or right front passenger is located.

Figure 8:
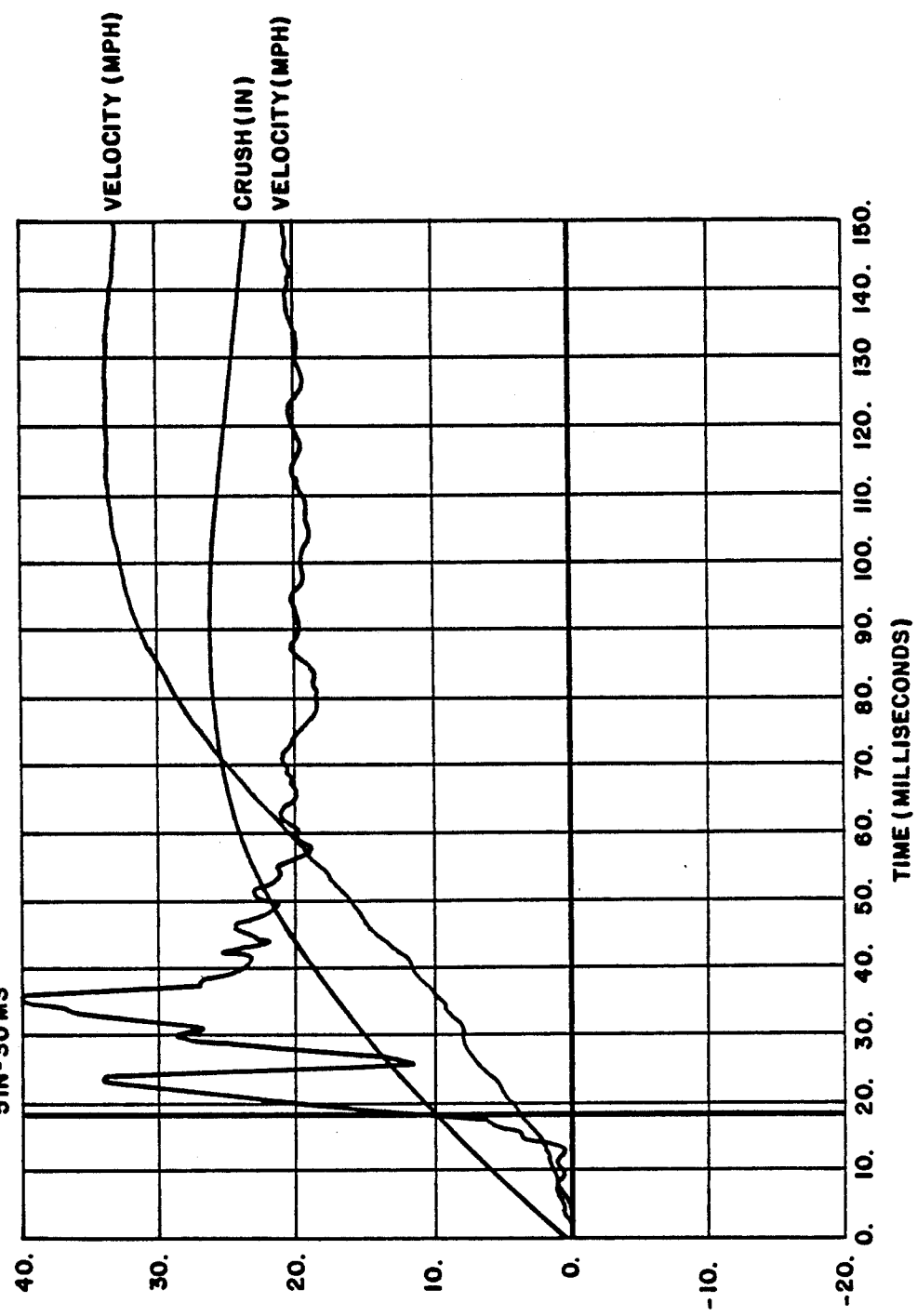
FIGS. 8–11 are each velocity and crush plots derived from acceleration data from crush zone and non-crush zone locations for a typical American car crashing head on into a barrier at 31 MPH, 14 MPH, 8 MPH, respectively, and crashing into a barrier at 31 MPH at a 30 degree angle.

From FIG. 8 we can see that sensor must trigger the air bag before 19 milliseconds. At 19 milliseconds the crush of the car is approximately 10 inches. The velocity change of the crush zone is already well on its way to 31 MPH indicating that the crush zone has impacted the barrier and is rapidly stopping whereas the non-crush zone is still moving at substantially the pre-crash velocity. The sensor placed within the 10 inch crush zone would therefore have been impacted by the barrier, or by material in front of the sensor, pushed back and thus, if this sensor were a switch of a design such as depicted in FIGS. 2 or 3 the switch would have closed and the restraint system deployed. From this graph we can see that the velocity at the accelerometer location begins diverging significantly from the non-crush zone velocity at a crush of about 9 inches. This indicates that this accelerometer was located approximately 9 inches from the front of the car. Naturally, as material in front of the accelerometer is crushed, the influence of the crush zone extends rearward and thus, the accelerometer was actually located 9 inches from the front of the vehicle plus the thickness of the crushed metal or approximately 11 or 12 inches.

Figure 9:
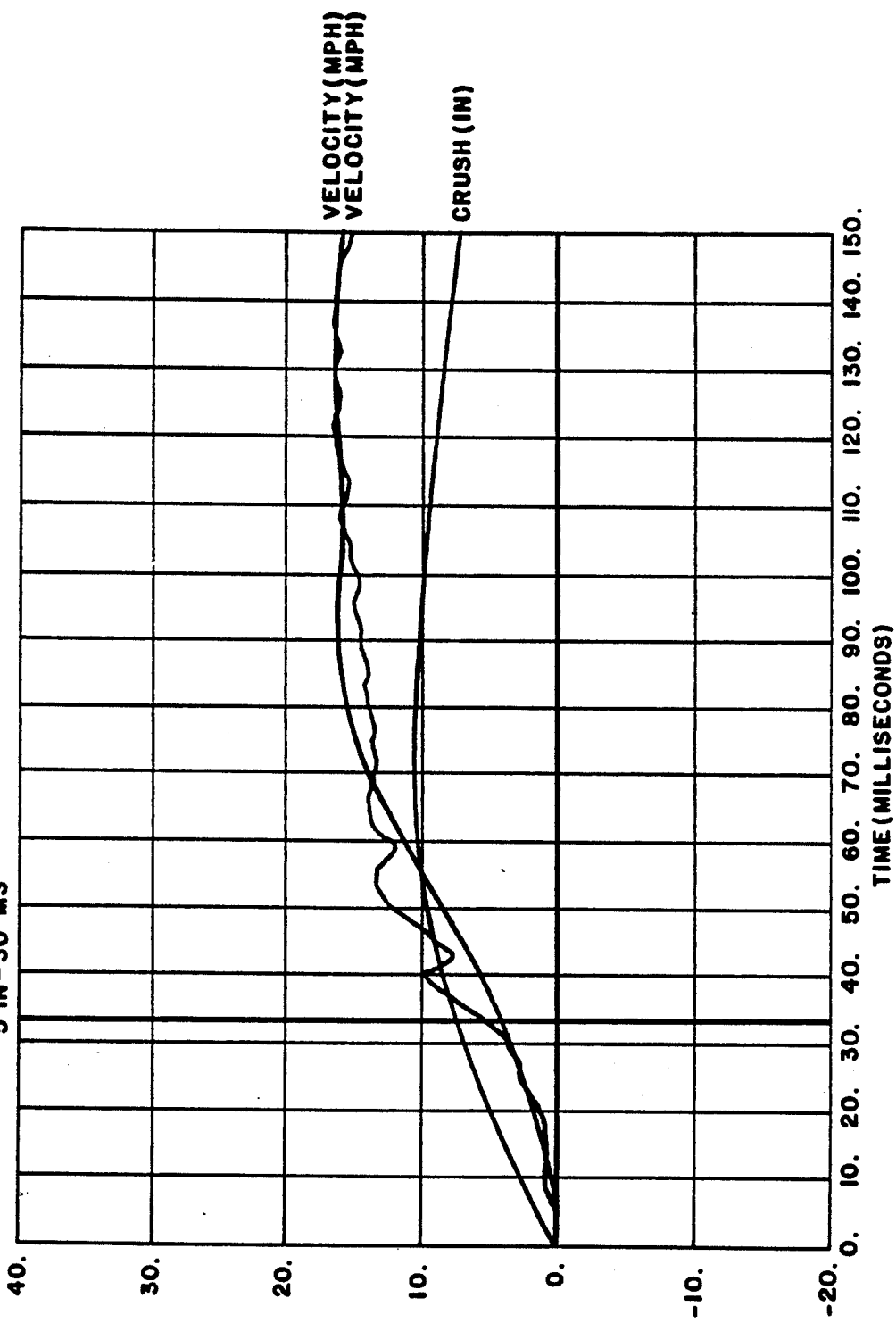

FIG. 9 shows a similar set of plots as FIG. 8. However, the initial velocity into the barrier was 14 MPH. For this case we can see that the crush at the time the sensor is required to trigger is about 7 inches. Once again, the crush zone accelerometer indicates that it was located at approximately 7 to 9 inches plus the thickness of the crushed metal and this sensor if it were of a switch type would have triggered in time or slightly late on this crash.

Figure 10:
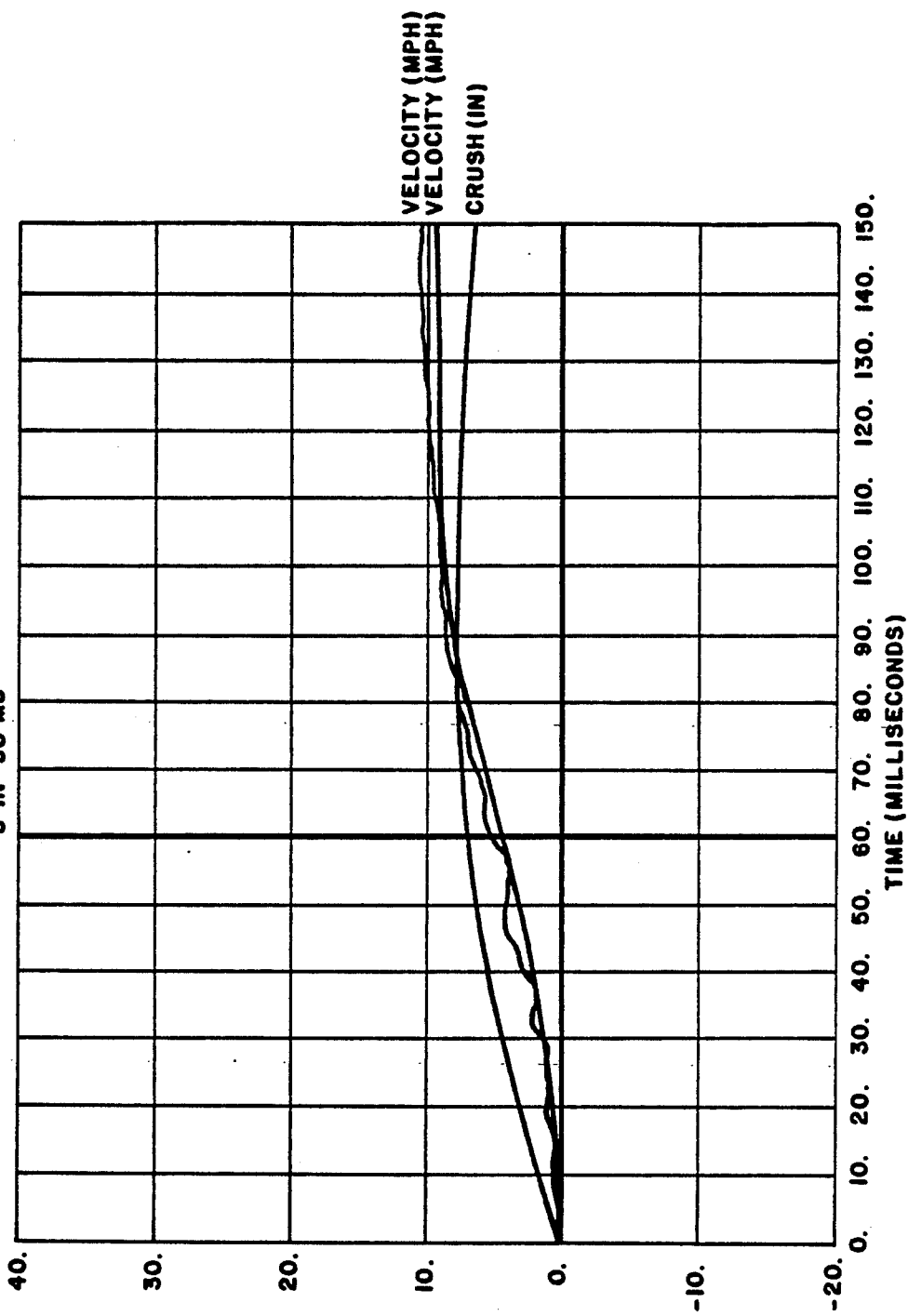

FIG. 10 on the other hand, shows an 8 MPH frontal barrier impact and for this case we can see that the crush never equals 8 inches and in fact, the velocity change in the crush zone and the non-crush zone are essentially identical. A switch therefore, located more than 8 inches from the front of the vehicle would not have triggered in this crash and, in fact, the requirement for this crash is a non-deployment of the restraint system.

Figure 11:
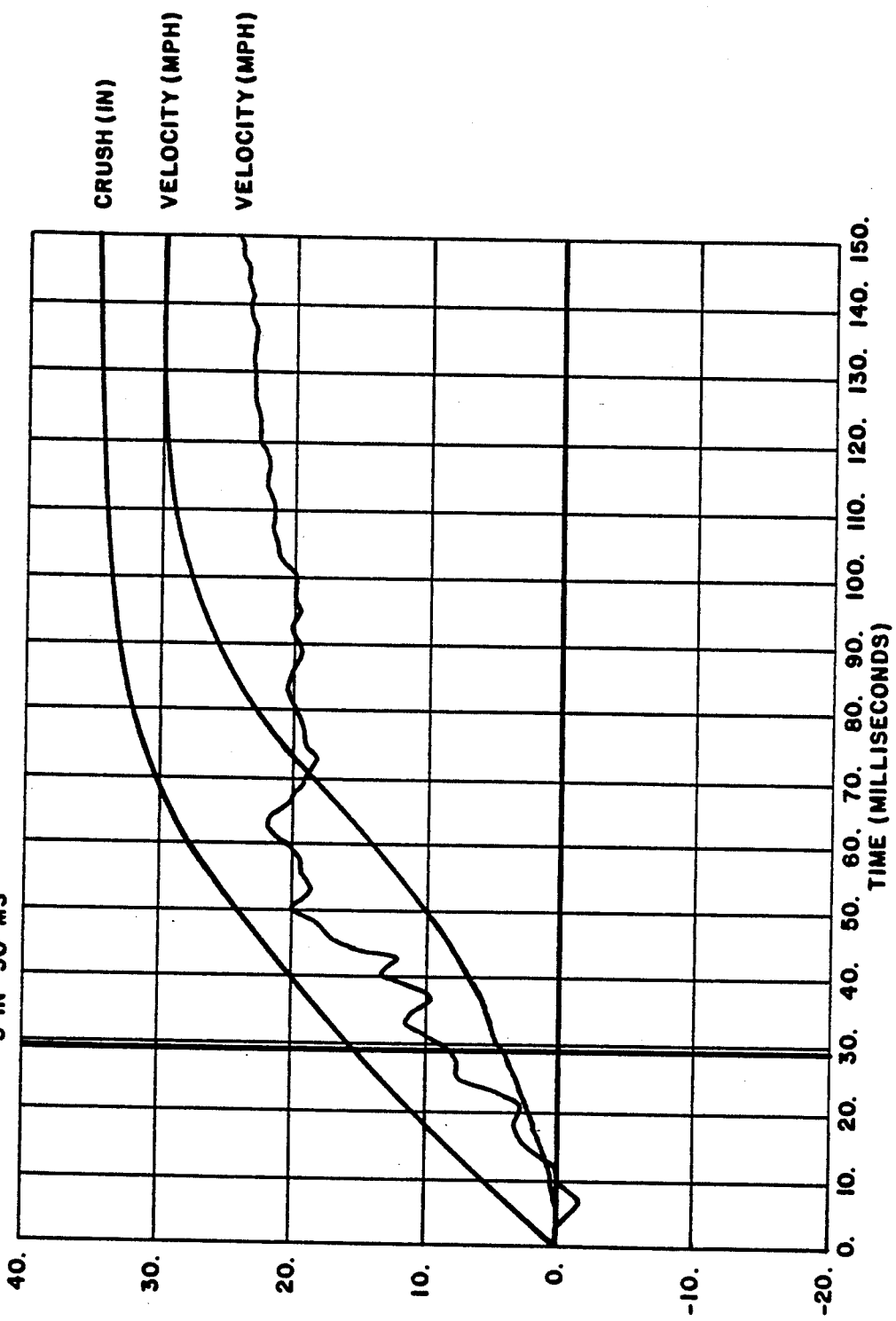

FIG. 11 shows how the new crush zone sensor would have performed in a 30 degree angle barrier impact at 31 MPH. Here we can see that for angle impacts the crush zone is significantly extended and the sensor can be located as much as 15 inches from the front of the vehicle at the time sensor closure is required. Fortunately, for this vehicle the front bumper is swept back on the sides and the front center sensor located 10 inches from the front of the vehicle is actually within the 15 inch crush zone which begins on the driver's side of the vehicle and proceeds angularly inward. So once again, the switch located at this location which is designed to respond to angular impacts would have triggered the air bag in time. It is interesting to note that an integrating sensor which requires a 10 MPH velocity change to trigger would not have triggered until at least 32 milliseconds or 3 milliseconds late. The switch sensor, however, would have seen sufficient force to trigger in time. There are some vehicles where the crush zone for an angle impact would not extend sufficiently rearward in the vehicle to place a front sensor in the crush zone. For these cases two sensors can be used one on each side of the vehicle typically mid-way between the center of the vehicle and the side. In still other cases involving very large cars with very soft front end structure, three sensors might be required in order to trigger in time on angular impacts as well as center line pole impacts. Alternately, a tape switch such as shown in FIG. 3 could be used, which could be installed across the entire front of the vehicle.

From the analysis illustrated in FIGS. 8–11, the exact location for placement of the crush zone sensor can be determined. For this example, the crush sensor must be no closer than 8 inches from the front of the vehicle otherwise it would trigger on the 8 MPH crash. Also it must be no further than 10 inches from the front or it would not trigger in time for the 14 MPH pulse. Since a simple switch sensor such as described herein is small and light in weight, it is usually possible to mount the sensor at the proper position. When the sensor is large and heavy as in the case of the ball-in-tube sensor, it is frequently not possible to mount the sensor at the ideal position.

An alternative strategy is also possible where the crush sensor is used to enable a non-crush zone discriminating sensor. In this case the non-crush zone sensor could be made more sensitive and would thus trigger earlier than otherwise. This arrangement would eliminate the need for a safing or arming sensor and would permit discriminating on high speed animal impacts where deployment of the restraint system is not desired. The one type of common crash which might defeat any crush zone sensor system, is a high speed deer impact, for example, where the sensor is directly impacted as the front of the vehicle is only crushed above the bumper. Typically the total velocity change for this type of crash is less than 4 MPH. Normally it is not possible to rely on the overlap of two discriminating sensors located at different points in the vehicle since a minimum contact closure duration for inertial type sensors cannot be guaranteed. For the switch sensor of the present invention, the natural frequency of the snap through mechanism can be set by design so that a minimum period of contact closure can be achieved.

The rotation of the crush zone sensor is a very common problem experienced especially in low speed and angular car to car crashes. Frequently, the crushing mode of the front of the vehicle is such that the material moves rearward in the vehicle and strikes the sensor on an angle. This was the case for the center radiator support accelerometers in both FIG. 8 and FIG. 11 as evidenced by the fact that the velocity at the Center Radiator Support never reached the same value and at the B-Pillar. In a low speed restraint desired crash, the crush zone sensor will frequently rotate early in the crash and thus be unable to sense and integrate the longitudinal acceleration. The crush sensor of this invention as depicted in FIG. 2 is designed to eliminate this problem since the front member of the sensor is shaped such that any impact to the sensor or any direction up to and exceeding 60 degrees from the longitudinal axis will push the front member rearward and cause the contacts to be bridged. Similarly, the tape switch design of FIG. 7 also is designed to close for any impact along the length of the switch and including angles plus or minus 60 degrees from the horizontal plane passing through the switch.

Operation of the crush zone crash sensor of this invention, as well as all others, is critically affected by the material which is located between the sensor and the front of the vehicle and the mode in which this material crushes and comes back to strike the sensor. The sensors of the present invention are considerably more tolerant to variations in the geometry of this material. However, since this material is in fact part of the sensing system, it is important that it be designed such that when the front of the vehicle collapses the material striking the sensor is as near to a flat plane perpendicular to the axis of the sensor as possible. This frequently requires redesign of such elements as the hood latch and hood latch brace, for example.

The mounting structure for the sensor also must be carefully designed to minimize the chance of sensor rotation during an impact. Naturally, this is much less of a problem with sensors of the present invention then with conventional crush zone sensors.

The force required to cause sensor closure is an important design parameter of the sensor of this invention. Similarly, the mounting structure must be sufficiently rigid to permit forces of this magnitude without deforming. In one typical design configuration, a 10 pound force on the sensor is required to move the front member toward the rear member sufficiently to cause sensor closure. In another design a 40 pound force is required to close the contacts. Such forces are sufficient such that the contacts are unlikely to be inadvertently closed during vehicle maintenance and some animal impacts and yet, these forces are quite low compared to the forces typically experienced during even marginal crashes.

Switch type crush sensors as depicted in this invention are also useful for sensing side impacts. A sensor which physically measures that the door has been crushed by an intruding object can be used for side impacts. In this case, however, the velocity change which occurs when the switch closes is quite small and not a predictor of occupant injury and therefore this application would be outside the scope of this invention. Such a sensor would be placed preferably on the inside door panel such that when a vehicle or other object begins crushing the door of the car this switch sensor is impacted and the air bag is deployed. In this case, the air bag would be located in the door of the vehicle and would be designed to protect the occupant from striking the vehicle door. A sensor which measured crush plus velocity change would have the proper function for a side impact sensor.

The exact placement of the sensor of this invention in the vehicle is a critical part of this invention. The only crush zone sensors which heretofore have been successful have been those which measure the velocity change of the crush zone. The sensor of this invention utilizes the crush of the vehicle to determine the velocity change of the vehicle during the crash. Therefore, it must be located in the portion of the crush zone which is penetrated when the velocity change of the vehicle exceeds the threshold requirement which is typically 8 MPH. A fact which is heretofore not been appreciated is that ball-in-tube sensors also must be in this same portion of the crush zone. If it is to far forward it will respond to momentary velocity changes of the front of the vehicle which do not result in a total vehicle velocity change. This happens, for example, when a vehicle impacts a animal at high speeds. Similarly, if a velocity change sensor is placed to far rearward in the vehicle it will be measuring the entire vehicle velocity change and thus trigger quite late on certain marginal crashes which could cause injury to an occupant who has been placed out of position by the accident.

Figure 13A:
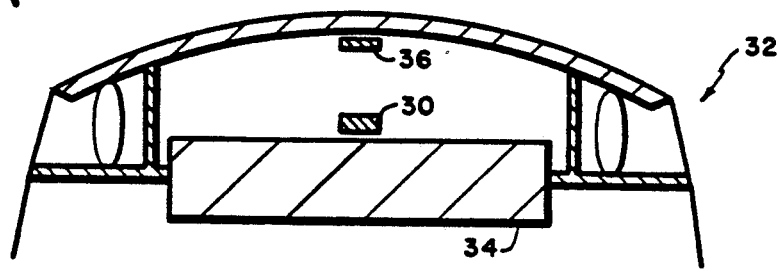
FIGS. 13A and 13B are schematic views showing the position of a sensor in a vehicle before and after a crash, respectively.
Figure 13B:
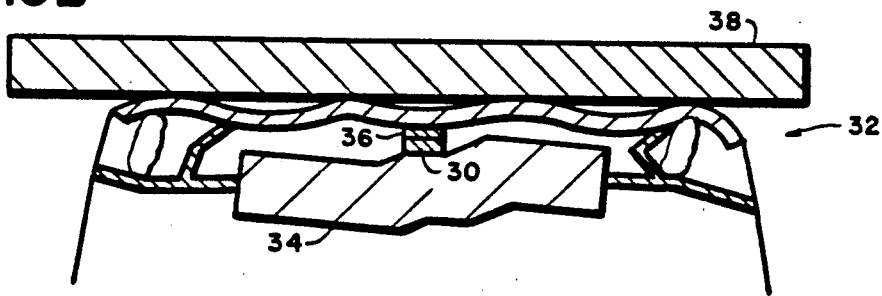

FIG. 13A illustrates the typical mounting position of a sensor 30 in the crush zone of a motor vehicle 32. The sensor 30 is mounted immediately in front of the radiator core 34 along the center axis of the vehicle. An impact element 36 mounted ahead of the sensor 30 is designed to move rearward when the vehicle strikes a barrier to contact and actuate the sensor 30. FIG. 13B illustrates the effect on the vehicle 32 of a frontal impact with a barrier 38. As may be seen, the sensor 30 has been contacted by the impact element 36.

Figure 14:
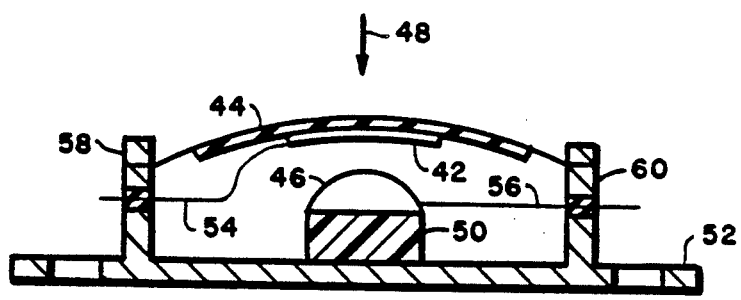
FIG. 14 is a cross section view of a another preferred embodiment of a crash sensor according to the present invention.

FIGS. 12 and 14–19 illustrate various alternative preferred embodiments of crash sensors which may be employed in accordance with the present invention. FIG. 12 shows an electronic pressure sensor 37 which is mounted on a plate 39 for attachment to the vehicle. The pressure sensor is coupled via wires 41 to the trigger sircuit of an airbag. FIG. 14 illustrates a deformable, dome-shaped membrane 40 which supports a conductive contact element 42. The membrane 40, which is preferably made of spring steel, may be provided with an insulating layer 44. A secondary solid dome 46, made of conductive material, is disposed opposite the conductive element 42 so that the two elements 42 and 46 make contact when the membrane 40 is displaced in the direction of the arrow 48. The dome 46 is supported by a post 50 mounted on the base 52 of the sensor. Flexible leads 54 and 56, connected to the contacts 42 and 46, are fed through side elements 58 and 60, respectively, on the base 52. The side elements of 58 and 60 extend upward and form end stops for the member or members which impact the membrane 40.

Figure 15:
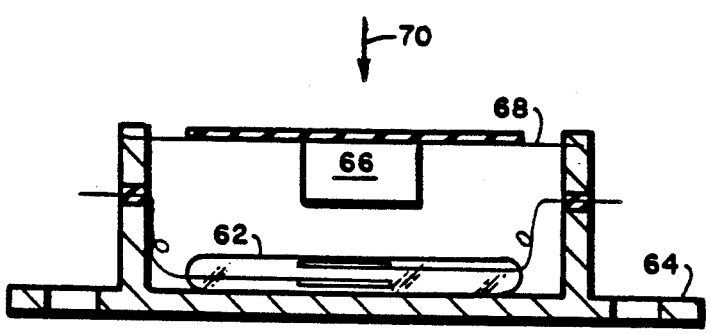
FIGS. 15–19 are schematic diagrams of still further preferred embodiments of a crash sensor according to the present invention.

FIG. 15 illustrates a magnetically actuated membrane sensor. A reed switch 62 is mounted on a base 64 to provide the electrical sensor contact elements. A magnetic core 66 is disposed some distance away from the reed switch. This core is mounted on a flexible membrane 68 which moves toward the reed switch when a force is applied in the direction of the arrow 70. When the magnetic core 66 approaches the reed switch, its magnetic field causes the reed switch contact elements to close.

Figure 16:
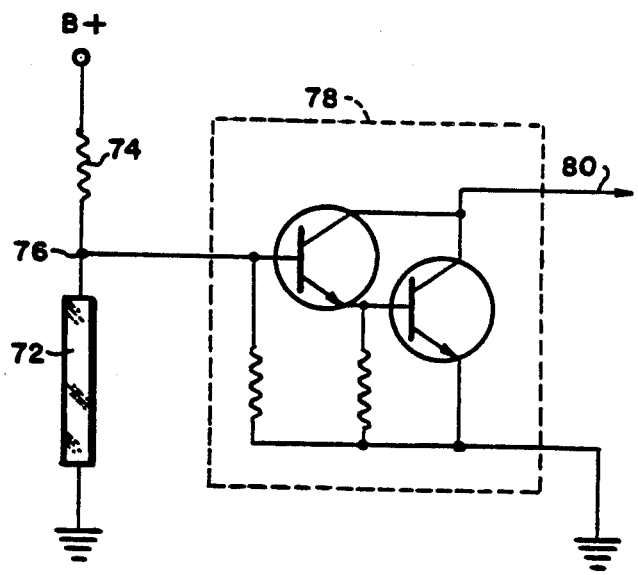

FIG. 16 illustrates a sensor comprising a frangible conductive device 72, such as a thin wire or a thin film mounted on a frangible substrate. Current is continuously supplied to the device 72 from a voltage source through a high valued resistor 74. When the device 72 is unbroken, the node 76 remains close to the ground potential. When the circuit is interrupted, for example by a vehicle impact which breaks the frangible device and severs its conductor, the node 76 will jump to the potential of the voltage source. A Darlington transistor circuit 78, such as the TIP120, will then saturate and provide a signal at its output 80.

Figure 17:

FIG. 17 illustrates an element which may be used as the frangible device 72 in FIG. 16. This element comprises a glass vial or brittle substrate 82 having conductive end caps 84 and 86. Between the end caps is a conductive coating which is interrupted when the substrate 82 is broken.

Figure 18:
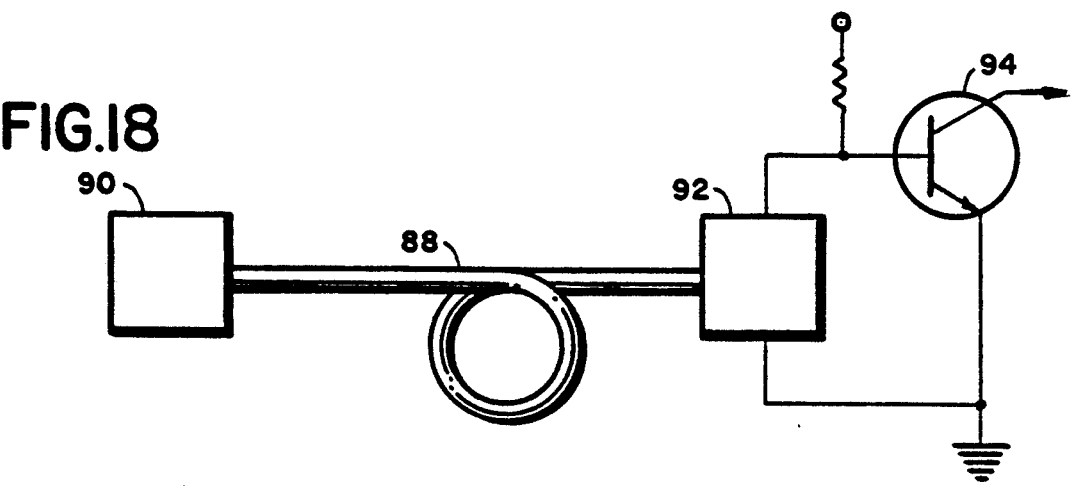

FIG. 18 illustrates a sensor that uses one or more frangible fiber optic elements 88 to sense crushing in the crush zone of a vehicle. A transmitter 90, such as a light emitting diode, continuously supplies light to one end of the fiber optic element 88. If the element is unbroken, the light will be received by a photodiode 92. If the fiber optic element 88 is severed, a change in the impedance of the photodiode 92 will cause a transistor 94 to change its state.

Figure 19:
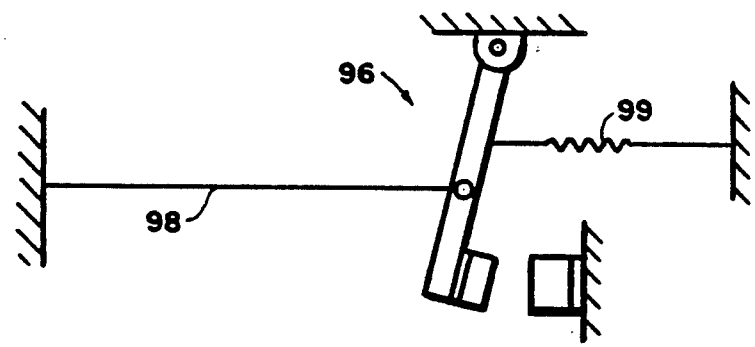

FIG. 19 illustrates a mechanical switch 96 that is maintained in the open state by a wire 98 against the force of a bias spring 99. Upon vehicle impact and crushing in the region of the switch 96, the wire 98 is either broken or released, allowing the bias spring 99 to close the electrical switch contacts.

As can be appreciated from the above discussion, all of the objects of this invention have been effectively attained in an extremely simple device. Although several preferred embodiments have been disclosed and described in detail herein, it should be understood that this invention is in no sense limited thereby and its scope is to be determined by the appended claims.

What is claimed is:

1. In a motor vehicle having a forward extremity, a crush zone immediately rearward of said forward extremity, a crash sensor arranged in said crush zone and an occupant restraint system responsive to said crash sensor, the improvement wherein said crash sensor comprises:
   means arranged at a given position in said crush zone of the vehicle for determining when the vehicle elements in said crush zone have been deformed as far back in the vehicle as said position; and
   means responsive to said determining means for actuating said occupant restraint system when a vehicle impact with a barrier causes said vehicle elements in said crush zone to deform as far back as said position;
   wherein said position is a sufficient longitudinal distance rearward from said forward extremity of the vehicle such that an impact by said forward extremity with a barrier at a vehicle speed below a prescribed threshold value will not actuate said occupant restraint system.

2. The improvement in accordance with claim 1, wherein said crash sensor comprises:
   a switch having a front member and a rear member;
   means for mounting said switch in the crush zone of the vehicle; and
   means for contacting and applying a force to said front member to cause said front member to be displaced relative to said rear member, and to cause said switch to change its conductive state, when the crush zone of the vehicle collapses on impact.

3. The improvement in accordance with claim 2, wherein said front member is designed so that said switch will actuate upon angular vehicle impacts.

4. The improvement in accordance with claim 3, wherein said front member is designed so that said switch will actuate upon angular vehicle impacts up to 60 degrees in any direction with respect to the longitudinal axis of the vehicle.

5. The improvement in accordance with claim 2, wherein a minimum 10 pound force on said front member is required to cause said switch to actuate.

6. The improvement in accordance with claim 5, wherein said mounting means does not deform under a 10 pound load.

7. The improvement in accordance with claim 2, wherein said switch is a tape switch.

8. The improvement in accordance with claim 2, wherein said switch is a snap action switch.

9. The improvement in accordance with claim 2, wherein said switch is a toggle switch.

10. The improvement in accordance with claim 2, wherein said switch is a normally open switch.

11. The improvement in accordance with claim 2, wherein said switch is a normally closed switch.

12. The improvement in accordance with claim 2, wherein said switch includes a hysteresis mechanism to provide for a minimum switch actuation period.

13. The improvement in accordance with claim 1, wherein said crash sensor comprises crushable material, a switch having a first member and a second member, means for mounting said switch in proper spacial relation to said crushable material such that when a vehicle experiences a crash of a predetermined threshold severity, the crushable material crushes and moves rearward in the vehicle to impact said first member causing it to move toward said second member, and means responsive to the motion of said first member towards said second member for indicating a crash.

14. The improvement in accordance with claim 13, wherein said response means comprises an electric switch.

15. The improvement in accordance with claim 1, wherein said determining means include a frangible device and means for detecting when said frangible device is broken.

16. The improvement in accordance with claim 15, wherein said frangible device is an electrical conductor and said detecting means include means for sensing the interruption of current passed through said conductor.

17. The improvement in accordance with claim 15, wherein said frangible device is an optical fiber and said detecting means include means for sensing the interruption of light passed through said optical fiber.

18. The improvement in accordance with claim 1, wherein said determining means include an electrical switch.

19. The improvement in accordance with claim 18, wherein said electrical switch is a reed switch and said determining means further include a movable magnet for actuating said reed switch when the vehicle elements adjacent said magnet cause movement thereof.

20. The improvement in accordance with claim 18, wherein said electrical switch includes a pair of switch contacts, means for biasing said contacts into a closed position and means for holding said contacts in an open position against said bias,
   whereby said holding means is released to cause said switch contacts to close when vehicle elements adjacent said holding means are moved.

21. The improvement in accordance with claim 1, wherein said prescribed speed threshold is approximately 8 MPH.

* * * * *